Figure 1:
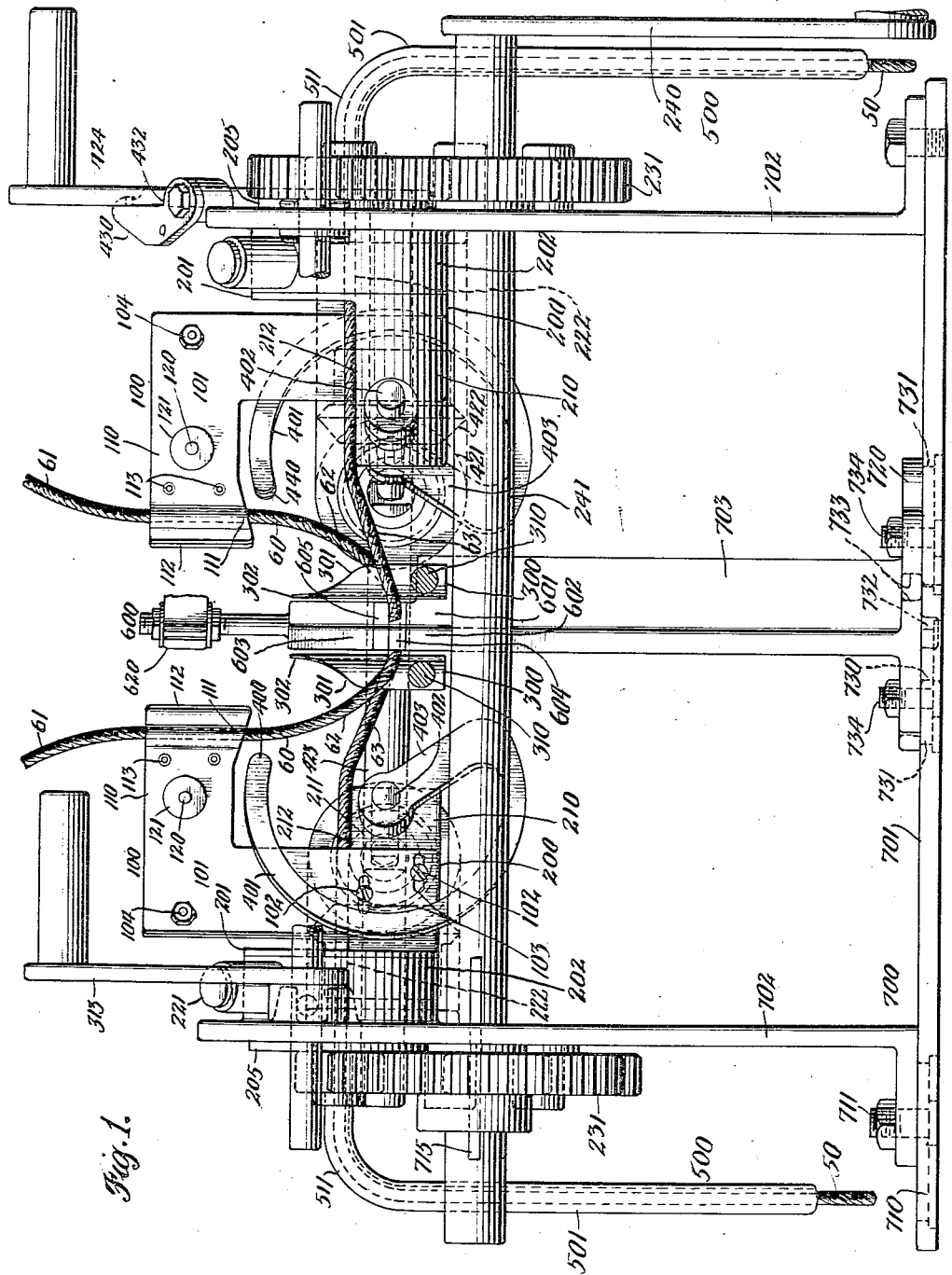

Feb. 12, 1957 J. P. TARBOX 2,781,213
BARREL KNOT TIER
Filed March 31, 1953 7 Sheets-Sheet 1

INVENTOR
*John P. Tarbox*
By *Richard E. Babcock Jr.*
ATTORNEY

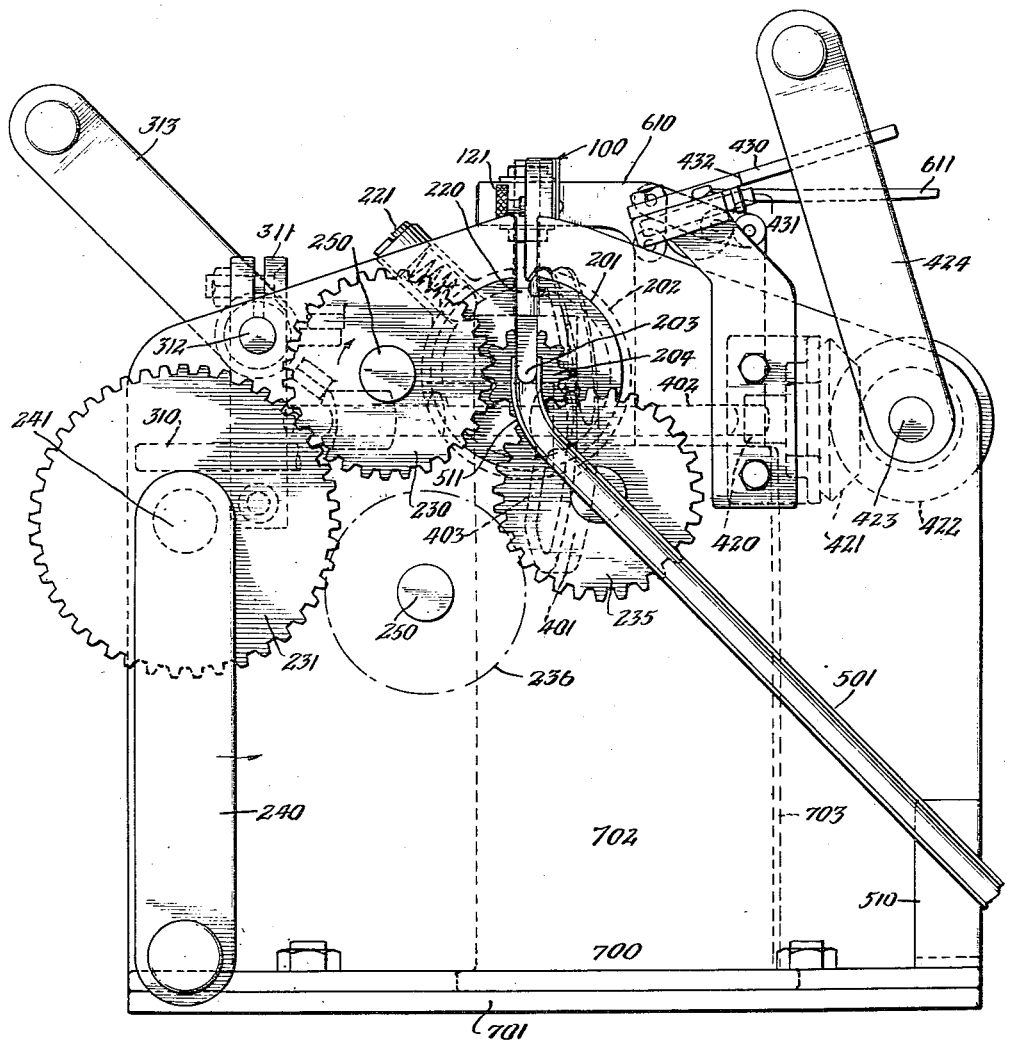

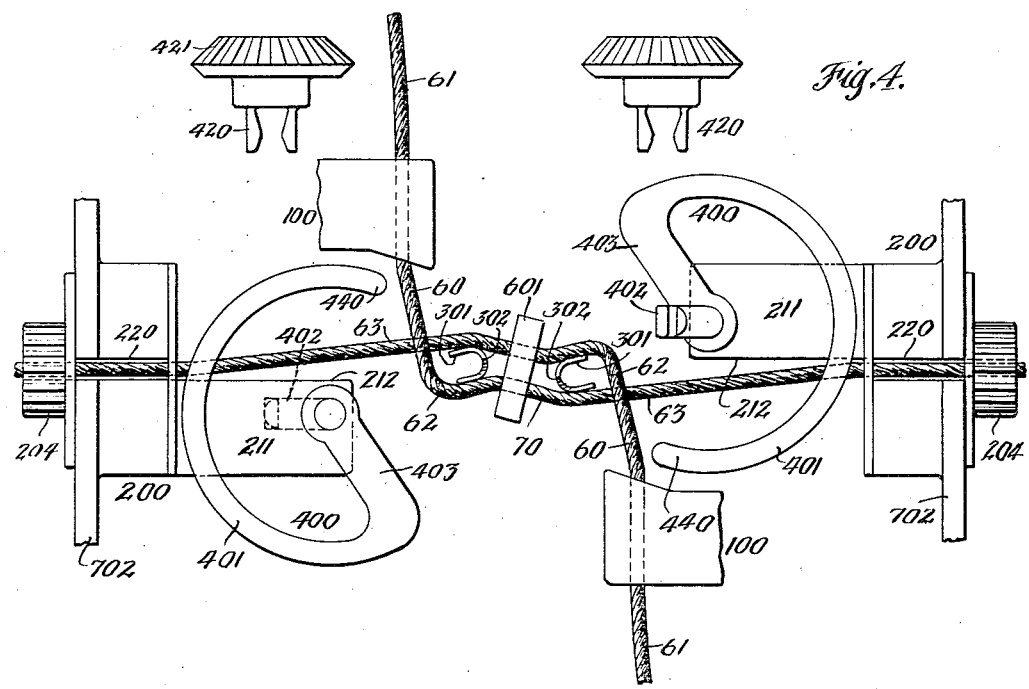
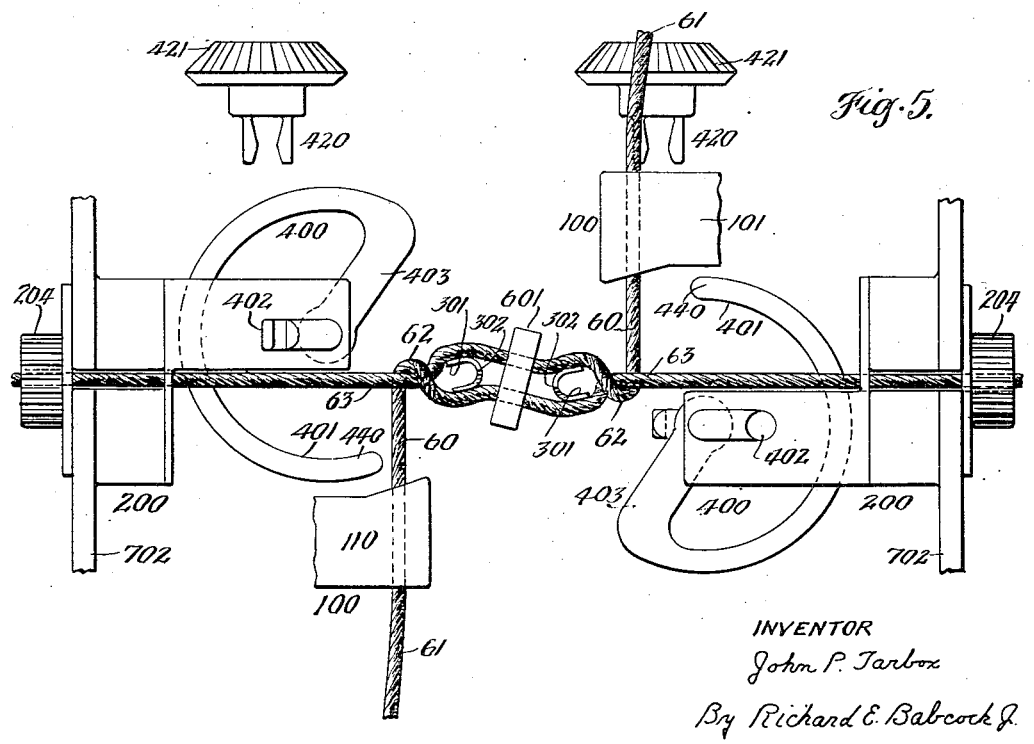

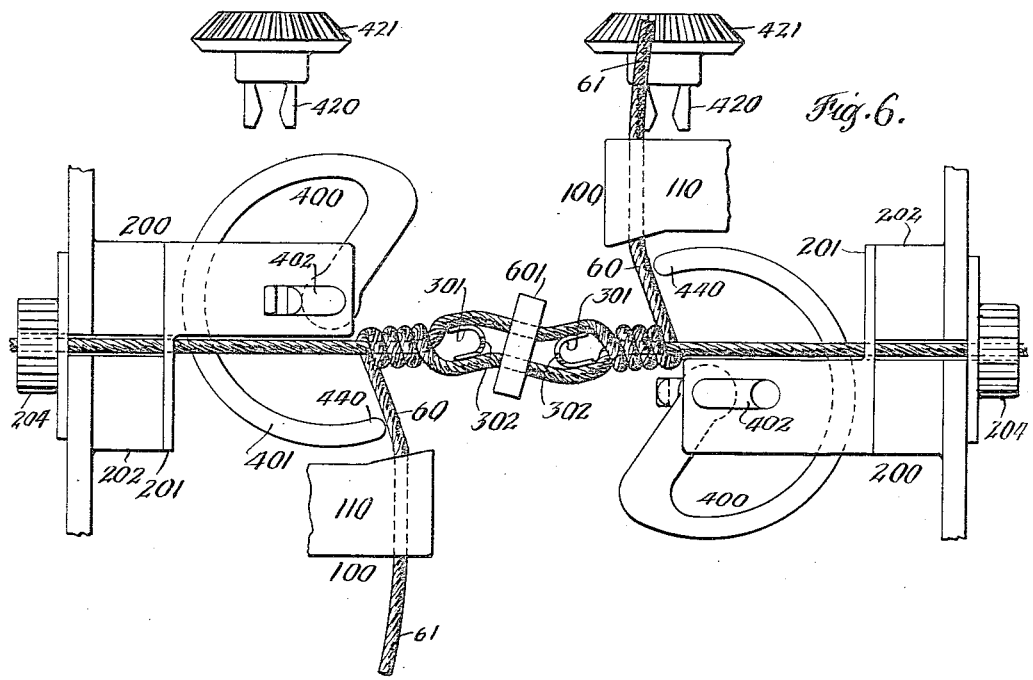
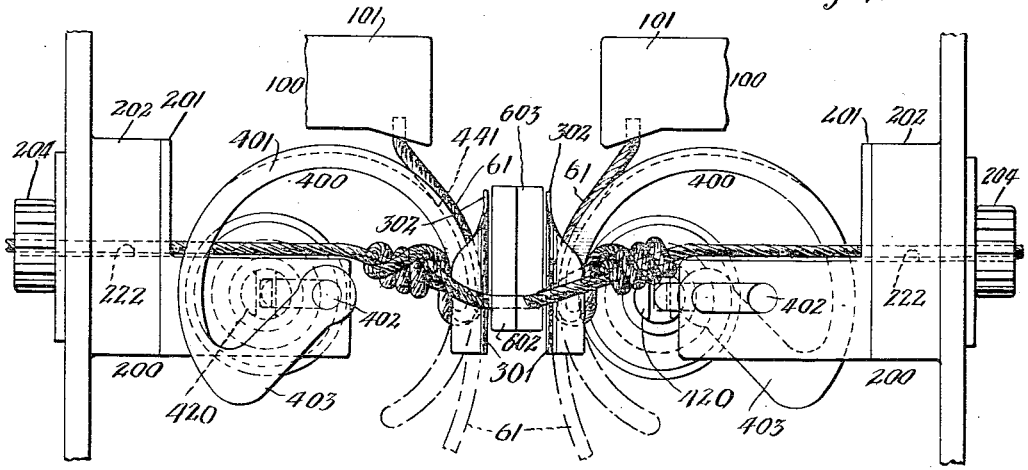

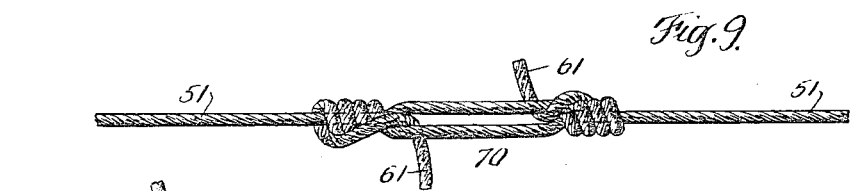
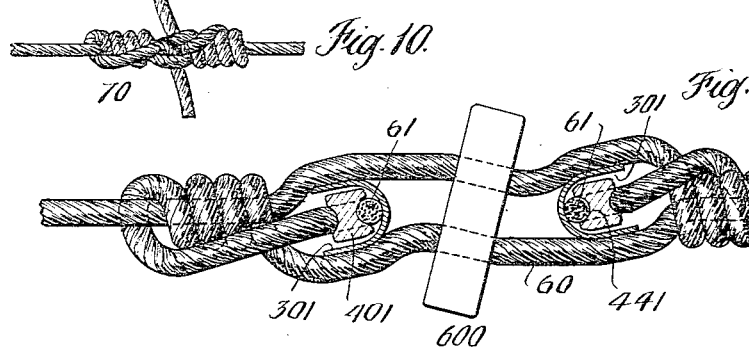
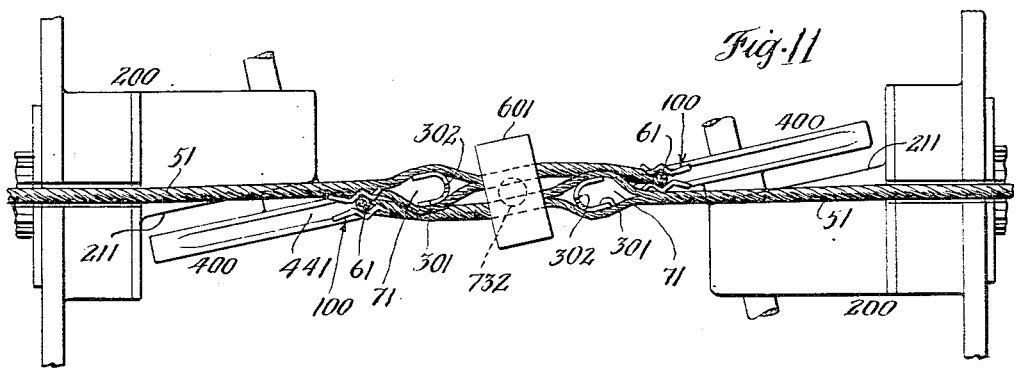
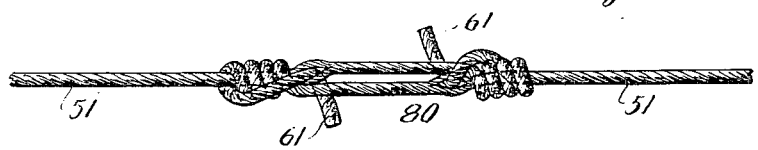

Feb. 12, 1957 J. P. TARBOX 2,781,213
BARREL KNOT TIER
Filed March 31, 1953 7 Sheets-Sheet 7
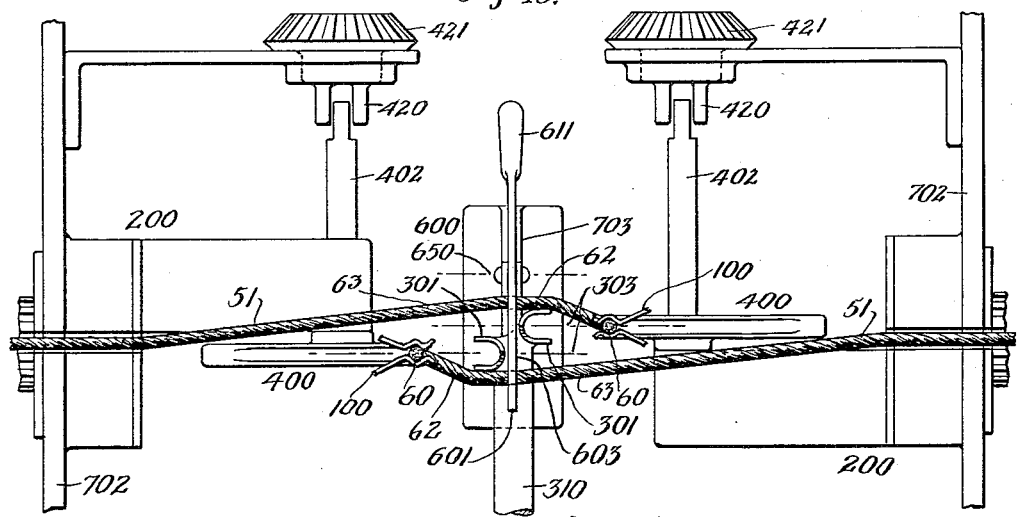
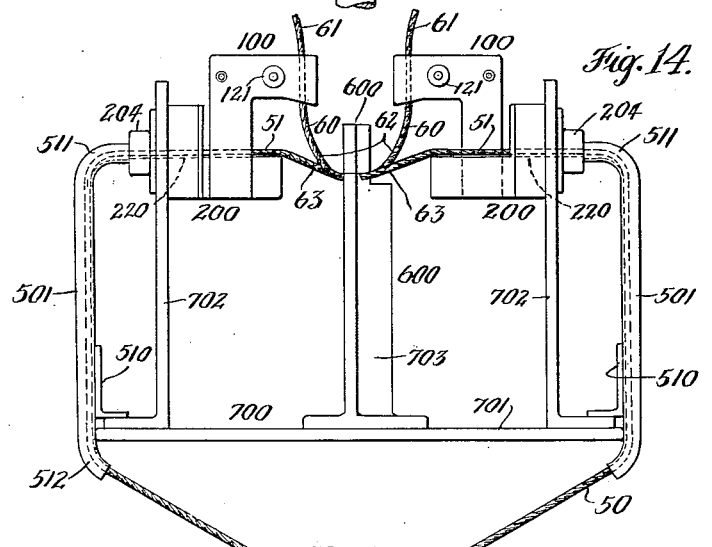
INVENTOR
John P. Tarbox
By Richard E. Babcock Jr.
ATTORNEY United States Patent Office 2,781,213
Patented Feb. 12, 1957

2,781,213

BARREL KNOT TIER

John P. Tarbox, Philadelphia, Pa., assignor, by mesne assignments, to Sperry Rand Corporation, New Holland, Pa., a corporation of Delaware Application March 31, 1953, Serial No. 345,946

6 Claims. (Cl. 289—2)

If it be desired to classify this barrel knot tie mechanism as to type it may be indicated that inasmuch as the lays of the free end strand of the loop whose ends are to be tied together are affected by movements of these strands in a direction toward the central area of the loop rather than away from the central area of the loop (with the idea that the loop area is the area of cross-section of a package about which the loop is to be extended) the invention may be said to relate to what may be called the overlay type as distinguished from one which may be called the underlay type in which latter the lay of the strand in the mechanism for tying may be made through movement of strands away from the central area of the loop. There are such differentiations in wire tie mechanisms.

The primary object of my invention is to produce a barrel knot tying mechanism especially adapted for the tying of barrel knots in baler or binder twine outstandingly for the purpose of testing these knots for relative strength and other qualities in the laboratory. However, it will become obvious at once upon an understanding of the invention, that many if not most of its features may readily be incorporated in bale, sheaf or other package tying mechanism.

Comparative laboratory tests to determine relative strength comprise tests of different twine materials e. g.: sisal, jute, viscose, rayon, fiberglass, etc. materials which have been given different treatments to vary their respective tensile and knot strengths; materials of different sizes, different numbers of strands, and combinations of these. Other comparative tests have to do with the direction of twists, variation in the number of twists per foot length, different numbers of wraps employed in the barrel knot itself, changes in the respective directions of the wraps or turns on opposite sides of the knot, differences in the directions in which the free ends are drawn through the centre of the knots, wrapping in directions against or with the twists, changes in the initial spacing between the wraps on opposite sides of the central section of the knot, variations in the lateral and longitudinal insertion of the free ends, and even variations in the knot itself, such for example as the splicing the free ends into the strand vs. their insertion between strands.

The important secondary object of my invention is to produce a machine which will enable knots embodying all these and yet other variations to be realized in the barrel knots in any kind and size of tying material within a wide range, and to be tied with a uniformity knot for knot and material for material, and with a rapidity which will facilitate the laboratory testing work.

In carrying out my invention I employ spaced means for yieldably engaging the oppositely extended and overlapping lengths of the free end strands to be knotted together, spaced rotatable means which mounts and rotates on a common axis either in the same or in opposite directions the aforesaid means for yieldably engaging the strands, spreader means separating the strands in the transverse plane of symmetry of the desired knot to provide for ultimate entry between them of the strand extremities, and extremity inserting devices operable in the region of the plane including the strand engaging devices and their axis of rotation for engaging and inserting the strand extremities between or into the strands; together with means for tensioning the strands during the tying operation; means for preventing the tension per se from disturbing the yieldable engagement of the means for engaging and wrapping the free end strands; means for appropriately rotating the mounts of said free end strand engaging members to enable them to achieve the wraps; means for appropriately positioning the strand spreading device in relation to the strands; and means for operating the extremity inserters.

In the embodiment which I shall presently describe, the means for yieldably engaging the free end strands are one form of spring clamp positioned and adapted to yieldably release the free end strands to the wraps of the knot generally radially of the axis of the knot much as thread is fed turn against turn upon a bobbin or spool. The rotatable mounts are rotatable journals and gears having slotted peripheries to admit the main strands of the loop subject to the tie, to the vicinity of the knot. The spreading means is open in the plane of the free end strand engaging means and the axis to receive the inserting means and the free end extremities (and in this case also reciprocable in that plane to strip the knot when it is completed) while the inserters in this embodiment are arcuate in form and centered with respect to the opening in the spreader through which their extended arcs pass.

Figure 2:
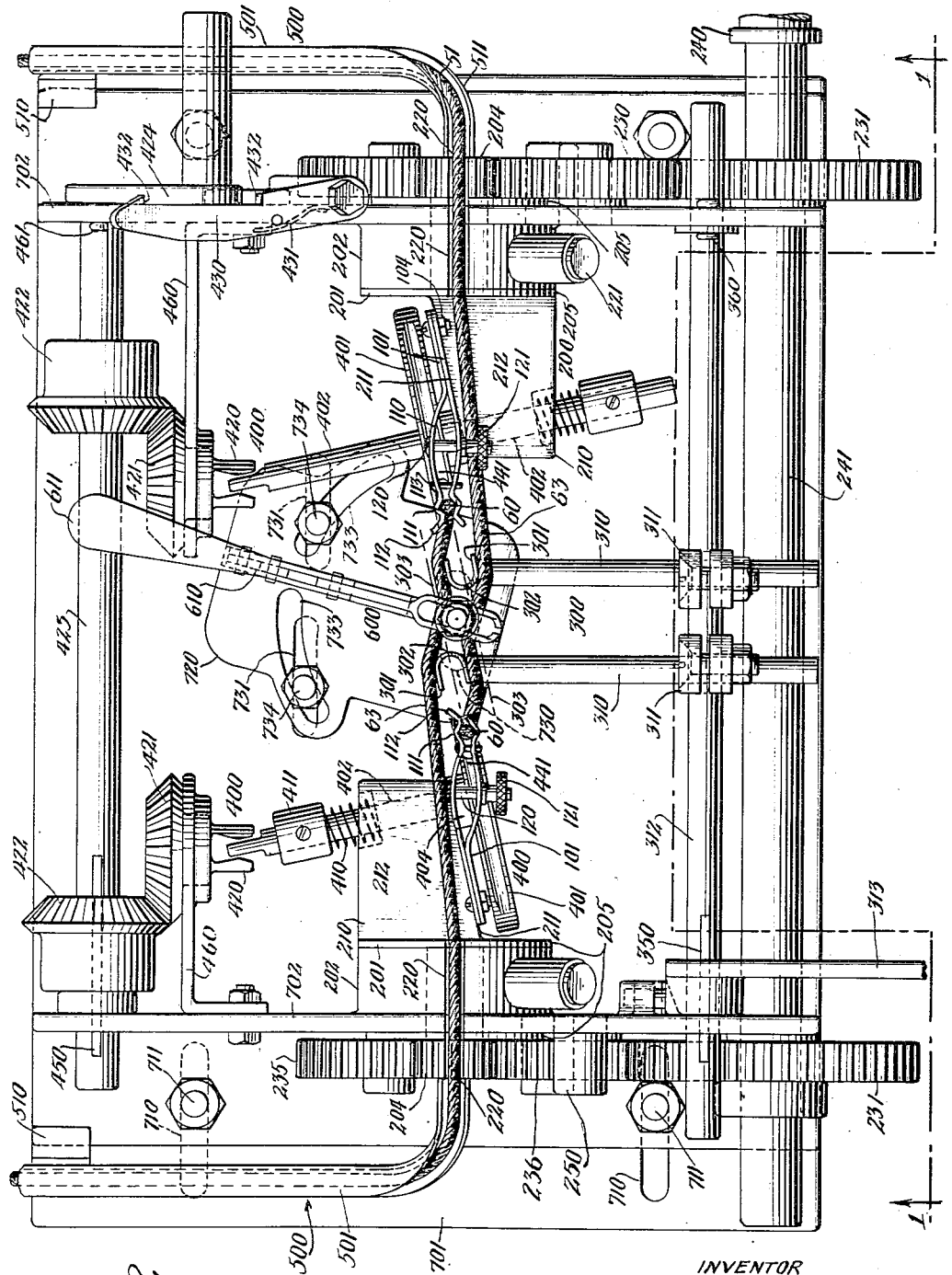

The drawings of this embodiment include:

Figure 1, a side elevation of the mechanism; partly in section on the line 1—1 of Figure 2.

Figure 2, a top plan;

Figure 3, an end elevation;

Figure 4, a top plan diagram of the operation of tying, showing the parts 90 degrees from their positions of rest in which the strands are first laid;

Figure 5, a top plan diagram of the parts 270 degrees from their positions of rest, that is, with the first wrap of the knot three-fourths completed;

Figure 6, a top plan diagram showing three wraps of the knot completed and a fourth within 90 degrees of completion;

Figure 7, a side elevation diagram showing four wraps of the knot completed and the free end extremities being inserted between the spaced middle portions of the strand;

Figure 8, a top plan diagram of the knot per se in that stage of completion diagrammed in Figure 7 and omitting all parts of the mechanism save sections of spreading means and inserters and the clamping means for the main strands;

Figure 9, a top plan view of the completed knot being drawn taut in the process of taking up slack in its central region;

Figure 10, a top plan view of the same knot with the slack completely removed;

Figure 11, a top plan view diagram showing a spliced barrel knot in the first stage of its making by the same machine, the respective free end strands being parted for the splicing operation before any wraps have taken place;

Figure 12, a top plan view of a completed spliced barrel knot made by this mechanism;

Figure 13, a top plan semi-diagrammatic view of a modified form of the foregoing embodiment;

Figure 14, a side elevation on reduced scale showing the strand tensioning means employed both in the principal embodiment and in the modification.

Referring now to the drawings: it will be convenient first to identify the loop, the free end strands of which are to be tied together, the free end strands themselves, their several portions, the ultimate knot and its several portions. The loop 50 as a whole, is most fully shown in Figure 14, though it appears in major part in Figure 1. The free end strands 60 appear in each of Figures 1, 2, 4 to 6, and 13 and 14. Their extremities are designated 61, while those portions which become wraps or turns constituting the barrel of the knot are designated 62. Those portions at and adjoining the center of the knot about which the wraps or turns are made, are designated 63. The completed knots appearing in Figures 9 and 10 are designated 70, and that in Figure 12, 80.

The free end holding means, which yieldably engages a free end 60 is designated 100; the rotatable gears and their journals which mount these free end holding means are designated generally 200; the strand spreading means generally designated 300; the inserting means for the free ends generally designated 400; the strand laying and tensioning means generally designated 500 (see Figure 14 more particularly); the clamping means which prevents the applied tension from affecting the yieldably engaging devices 100 designated 600; and the general framework which mounts the parts at large generally 700.

The yieldably engaging free end clamps 100 are of the leaf spring variety, each comprising a pair of leaf spring plates 101, in this case of L-shape, whose elongated main bodies are rigidly secured at their lower extremities and attached to their rotatable mounting means 200 by means of machine screws 102. This attachment is through axially elongated slots 103 in the leaves 101 through which the machine screws pass, whereby the pairs of leaves may be axially adjusted to axially relatively adjust the clamps toward and from each other and toward and from the transverse plane of symmetry of the joints to be formed. By providing slots 103 with certain excess of width or inclining them axially, a certain amount of angular adjustment of the clamps 100 is also had. The upper portions of the vertical branch of the L of the plates or leaves of the clamps are also rigidly secured together by means such as bolts 104.

However, the horizontally extending shorter branches 110 of the L which constitute the clamping jaws per se, extend toward each other and toward the center of the joints to be formed and are relatively bowed or otherwise spaced apart, as clearly appears in Figure 2, but approach closely together at their extremities where they are grooved vertically as at 111 to receive and clamp about free end strands 60, and provided with outwardly flared end portions 112 to enable a free end strand 60, pressed into the jaws, the more readily to part them against their tension and enter the strand receiving grooves 111. While both leaves 101 are shown as bowed at 110, and both grooved at 111, obviously this bowing and grooving and spacing may be confined to but one of the leaves 101. For preventing free end strand 60 engaged in groove 111 from passing into the interleafed space beyond the grooves, pins 113 whose heads are riveted to one of the plates 101, are passed freely through apertures in the opposite plate between the grooves 111 and the interleafed space beyond them. For regulating the tension of the spring clamp and the degree of yieldability of engagement of the jaws with the free end strand 60, studs 120 are fixedly secured to one of the jaws 110 in its mid-portion and extended freely through the other, where their projecting threaded ends are provided with knurled thumb nuts 121 through the turning of which the degree of relative or decrease of clamping pressure and friction drag of the grooves 111 about the free end strand 60. The spring leaves themselves, especially in the jaw portions 110, need be appropriately tempered of course.

The gear and journal mounting means 200 in this case is principally constituted by large journals 201 mounted in journal bearings 202, having a common longitudinally extending axis 203. The gear which drives these journals is designated 204. Journal flanges 205 retain the journal in place in the bearing 202 in each case. Axially inward extensions 210 from the journals 201 which themselves are of an approximate 90 degree segmental cross-section (examine especially Figures 1 and 2 in this connection) carry the associated free end strand engaging means 100 upon one (211) of their generally radially extending faces 211, 212. The one face 212 is parallel to the axis of the journals while the other face 211, in the embodiment of Figures 1 to 3, lies at a slight angle thereto with the result that the vertical main bodies of the L-shaped leaves 101 lie at that angle to the axis and in planes which, if extended, are slightly spaced apart. This, for reasons which will presently appear.

The journals 201, their bearings 202, the retaining flanges 205, and the driving gears 204 are commonly slotted as at 220 to a radial depth beyond axis 203, by the radius of the maximum diameter of the twine it is expected to use in the mechanism. When the parts are in the position shown in Figures 1 to 3 with the free end engaging means 100 in the vertical rest position shown, slots 220 are in the vertical plane and are in alignment with each other. Alignment of the fixed bearing slot with the rotatable journal retaining flange and gear slot in rest position, is assured by a spring pressed ball and socket alignment adjustment and retaining device 221 between the bearing 202 and the main body of the journal 201 (see dotted line showing in Figure 3). The axially parallel faces 212 of segments 210 lie in planes substantially tangent to the bottoms 222 of the slots 220.

The driving means for each one of the rotatable journals and gears 201, 204 comprises a train of gears (see especially Figure 3) 230, 231 and alternatively a train 235, 236, 231. These trains are commonly rotatable by a hand crank 240 operating upon a through running shaft 241, so commonly rotating the gears and journals 204, 201 in their axially spaced apart relationship in which they mount, space apart, and rotate the free end strand engaging devices 100. The gears 230, 236 with their respective trains are of the same diameter and are interchangeably mounted upon journaling studs 250 whereby, at either end of the mechanism, either gear train may be used: either the train 204, 230, 231 or the train 204 235, 236, 231. The result is that at either end of the machine the gear and journal 201, 204 at that end of the machine may be driven in either direction. Through this means the wraps or turns of the barrel joint effected through rotation of the clamps 100 may be made either in the same or in opposite direction, and in either case, either with or against the twist of the twine itself. Furthermore, for each complete wrap the stop and alignment device 221 operates by click and feel to give notice as each wrap or turn is completed, enabling one to count the number of wraps as the knot proceeds, and on completion of the last wrap to accurately align the several slots 220 and position the parts for removal of the completed joint and for the next ensuing operation.

Means 300 for spreading the strand 60 in the region of the center of the knot to facilitate the entry between them of extremities 61 to complete the knot, are located substantially midway between the two juxtaposed free end strand clamping means 100, and the rotatable mounts 200 which carry them. This means 300 in this embodiment is bipartite, and comprises a spaced pair of pointed metal quills 301. In their strand spreading position illustrated in Figures 1 and 2, they project vertically upward between the strands with their main bodies lying generally below the horizontal plane of the bases 212 of the segmental extension 210 which mount the clamps 100, and their curvilinearly sharpened points 302, lying generally above this plane. The bights of their U-shaped sections are juxtaposed, while their mouths face in opposite directions.

Their planes of symmetry designated by the dash and dot lines 303 are parallel to the axially inclined clamp mounting faces of segments 210 for reasons which will presently appear. The metal quills 301 are supported from their lower ends through rigid connections (as by welding) to the inner ends of a pair of supporting rods 310 which, at their outer ends have universally adjustable connections 311 with a longitudinally extending rockable shaft 312 paralleling shaft 241 and provided with an operating handle 313 through manipulation of which, shaft 312 may be rocked at will. It may be counterclockwise (looking at Figure 3) to project the spreader quills 301 to the positions illustrated in Figures 1 to 3 and spread apart free end strands 60; and clockwise to retract them from those positions. The universal connections 311 illustrated, as can be clearly seen from the plan of Figure 2 and the elevation of Figure 3, are comprised simply of a bar of metal whose ends are provided with bores at right angles to each other to receive, the upper and lower of them respectively, the rock shaft 312 and the connected spreader supporting rod 310, and to be clamped about them by clamping bolts which draw together the slotted extremities of the bar.

The means 400 for inserting the free end strand extremities between the spread strands, embodies as central elements the pair of narrow but elongated arcuate inserters 401 mounted and operated respectively in the planes of symmetry 303 of the spreader quills 301. Mounted and operated in these planes their main bodies are parallel to the clamp mounting faces 211 of segments 210. Their mounting comprises an oscillable axis shaft 402 journalled in a bore through the segment 210 and therefore, parallel to face 212 and at right angles to mounting face 211. The arcuate main body of the inserter is rigidly connected to the axis through radial actuating arm 403 in the same plane with the arcuate main body. Spacing from mounting face 211 and the adjoining lower end clamp members 101, is maintained by the mounting hub or washer 404 intervened between arm 403 and mounting face 211. Spring 410 intervened between the outer recessed surface of segment 210 and the adjustable collar 411 on axis shaft 402 constitutes means for adjusting and frictionally holding the arcuate inserters 401 in the positions to which they may be moved by the turning of the axis shaft 402.

Means for turning axis shafts 402 comprises the one tooth jaw clutch connections 420 of the axis shafts on one and the same sides of the mechanism, to bevel gears 421 which in turn mesh with bevel gears 422 on an operating shaft 423 provided with an operating handle 424 and paralleling operating shafts 241 and 312, but lying on opposite sides of the mechanism. Operating handle 424 is normally latched against extensive movements by a pivoted latch member 430, which is borne against it by the latch spring 431 to confine movement of the handle 424 to movement between the opposite sides 432 of a slot in that edge or face which bears against the handle. This slot is of such width and so located that oscillation of handle 424 moves gears 422, 421 through that slight angular range necessary to take up the back lash in the gears and so much of the lost motion in the one-tooth jaw clutches 420 as is requisite to insure verticality of the jaws of the clutch thereby to facilitate engagement and disengagement of the clutch before, during and after rotation of the inserters 401 incident to the wrapping of the knot.

The arcuate extent of the inserters 401 and the at rest position of the mounting arms 403 is such that their strand engaging extremities 440 normally lie close to the lower or delivery ends of the grooves 111 of the free end clamps 100 and close to the bodies of the free end strands 60 as they emerge from grooves 111, whereby, when inserters 401 are rotated to move their engaging points 440 toward each other, the bodies of strands 60 are always in position to be engaged by them irrespective of the number of wraps (within reasonable limits) which are to comprise the knot. To facilitate, insure, further and continue the engagement of extremities 440 with the strand 60, the ends 440 themselves, and the arcuate main bodies for some distance back of the end, are concavely grooved as at 441 on a radius approximately equal to the maximum diameter of the twine to be operated upon (see particularly Figures 8 and 11 in addition to Figures 1 and 2) and the grooves are flowed smoothly into each other from the top of the inserters around the extremities 440 and under them. As in case of the edges and points of the quills 301, all corners are smoothly rounded to eliminate every edge which may otherwise be of such sharpness as to cut the fibres of the twine.

The spreader quills 301 which lie in the plane of the inserters 401 are located at a distance from the axis shafts 402 of inserters 401 such that when a free end extremity 61 is engaged by the inserter extremity 401 to lie in its grooves 441 and is carried downwardly as shown in Figure 7, the body of the strand extremity 61 as it lies in the outer groove 441 may pass tangent or close to the inner surface of the bight of the U. In other words, the relative locations of the inserters 401 and the spreaders 301 is such that when the inserters are rotated toward each other, they and the looped ends of extremities 61 which they carry are accommodated within the open strand space provided by the spreaders.

The strand laying and tensioning means 500 comprises channel sectioned guides 501 for the main body strands 51 of the loop 50 (Figures 1 and 2) together with a weight 502 provided with a hook 503 at its upper end adapted to be engaged over the bight 52 of loop 50. Any equivalent tensioning means may be employed in lieu of the weight. The channel section guides 501, as shown more particularly in Figures 14, are supported in position by brackets 510. Their upper ends are axially inwardly curved as at 511, and the bottoms of the guiding channels there deliver directly into the grooves 220 of the gears 204 and journals 201. The lower ends 512 of guides 501 are curved inwardly and in the direction of the tensioning means 502.

The clamping device 600 which prevents the applied tension of means 500 from affecting the yieldably engaging devices 100 in their handling of the free end strands also gives the strands at the center of the knot their initial spacing. This device is located substantially in the medial transverse plane of the mechanism and intermediate the two spreaders 301. It comprises, in the embodiment of Figures 1 to 3, a rigid jaw type clamp 601 comprised of a fixed jaw 602 adapted to be engaged with the strands from below, and movable jaw 603 adapted to be engaged with them from above. Either or both of the jaws may be grooved as shown in Figures 1 and 7, to space the main bodies of strands 60 apart when initially threaded in the mechanism. The relative dimensions of the grooves and the relative approach of the faces of the jaws together is such as to enable the strands to be clamped fixedly in position against the tension set up in loop 50. The horizontal plane of meeting of the jaws is substantially at the level of the horizontal plane of the faces 212 of mounting segments 210 (as shown slightly below that plane) and either at or near the plane of the axis shafts 402 of the inserters 401. Operation of the clamp 601 is by means of a toggle locking lever mechanism 610 of one of the usual and generally known forms used in toggle locking clamps. When the operating end 611 of such lever is raised, the toggle is broken and movable clamp can usually be raised through about 90 degrees. When it is depressed, movable jaw is moved into coaction with the lower jaw and locked in gripping position through an overthrow action. An adjustment 620 is provided between the jaw 602 and the operating lever 610. This is in the form of a threaded rod passing through the end of the lever 610 and having a jam nut connection therewith. Preferably the upper and lower jaws of the clamp are both removable and replaceable or provided with removable and replaceable face plates 604 and 605 as shown in Figure 1, whereby clamps of any jaw width and any groove spacing may be employed respectively to adjust the clamping engagement and the length of twine employed between the wraps of the knot and to widen or narrow the space between the strands.

These various devices 100 to 600 which inter-act to comprise the mechanism at large and function to tie the barrel knot, are commonly supported by a framework 700 comprising a base plate 701; vertically extending parallel end plates 702 and a vertically extending pedestal 703. Plates 702 commonly support and journal the rotatable wrapping devices 201, 204; the train of gears 202, 230, 231 and 202, 235, 236, 231, the latter of which are stud mounted on the outer faces of plate 702 by plate borne studs 250; and the through running operating shaft 241. One of these plates, the right hand one shown, is fixed in position upon the base plate 701; while the other, the left hand one, is longitudinally adjustable toward and from the fixed end plate through the employment of slots 710 in the base plate accompanying the securing bolts 711. Shaft 241 at this end is provided with a sliding key connection 715 with the gear 231 which it mounts, whereby, when plate 702 is longitudinally adjusted, shaft 241 may slip freely through the gear 231 without disturbing the relationship of gear 231 to the remainder of its train. End plates 702 also mount the parallel shafts 312 and 423 of the spreader and inserter devices respectively. Like gear 231 on the left, the handle 213 and the beveled gear 422 which lie on the left in Figures 1 and 2, have sliding key connections with their respective shafts, the one numbered 350 and the other 450. The mating gears 421 to gears 422 are journaled in brackets 460 fixed to the end plates 702. The opposite or right hand ends of shafts 312 and 423 are prevented from moving endwise through the right hand plate 702 by the provision of appropriately placed stops shown in the form of cotter pins 360 and 461.

Thereby, when the left hand end plates 720 are longitudinally adjusted as described, all coacting parts mounted upon the plate are simultaneously longitudinally adjusted without disturbing their interaction with each other and without disturbing any of the parts supported by the right hand plate 702.

The pedestal 703 supports the strand positioning and tension resisting device 600, the fixed jaw 602 of clamp 601 being rigidly mounted directly upon the upper end of the pedestal. The base 720 of the pedestal is secured to the base plate 701 through two interacting systems of slots: one, a rectilinear system 730, 731 in the base plate 701, and the other an arcuate system 733 in the pedestal base 720. Slot 730 lies in the vertical plane of the slots 220 of device 200 and of the axes of the knots to be tied. Slots 731 are to one side of that plane. A pin 732 projecting downwardly from the base 720 into slot 730 in a plane including the center of clamp 601 midway between its strand engaging grooves, and therefore, acts to center clamp 601 in the axial vertical plane. Slots 733 in horizontal projection intersect slots 731 and their arcs are centered on pin 732. Clamping bolts 734 projecting through the intersections enable the base 720 to be clamped in adjusted positions. Through this construction base 720 and hence clamp 610 may be adjusted angularly with respect to the axis of the knot in any adjusted longitudinal position rendered possible by the length of the slots 730, 731.

*Operation*

The loop 50, the free end strands 60 of which are to be tied together by the barrel knot to be tested, is usually chosen of such length (including of course the free end 60) that when the knot has been tied and the bight 52 of the loop cut at the middle, each side of the loop affords sufficient length to be secured in the testing machine adequately to resist dislodgement by the application of tension forces greater than the ultimate maximum strength attainable in either the body of the twine or the knots. The tension adjusting means 500 is such as to allow reasonable variations in length depending upon the number of wraps required to complete the testing, the length of the knot, the length of the inserted end extremities, and the nature of the particular testing machine in which the tests are to be carried out. Either through tying an experimental knot or two by hand or by use of the mechanism described, adjusted to approximate suitability to the knot desired, the lengths of the free end strands which enter into the knot are determined, whereafter it remains but to allow sufficient length in the loop per se to provide for securement in the particular tensile testing machine to be used.

To adjust the mechanism at large to tie a knot of a chosen number of wraps, first the spreader 301 nearest the fixed or non-adjustable end of the mechanism, for instance the right hand end shown in Figures 1 to 3, is adjusted to be near enough to the engaging end of its inserter 401 and in line in the common plane 303, to afford appropriate insertion within the hollow cross-section of the spreader of twine of the diameter being operated upon. Next the associated free end strand clamp 100 is adjusted to place its delivery end (the lower end of groove 111) approximately in vertical alignment with the middle range of the number of wraps desired as laid side by side and touching each other. When the number of wraps is small as for example, from one to three or four, little if any readjustment is necessary once this has been set. The adjustment is brought about through the loosening of machine screws 102 and longitudinal or angular movement of the clamp to place groove 111 in the position desired, followed by retightening of the screws.

Clamp 601 is then, or previously, equipped with upper and lower jaw plates 604, 605 of a length corresponding to the length of strand initially to constitute the center of the knot between the spreaders. This may be as little as an eighth of an inch and as much as two inches or more, depending upon the amount of slip allowable for ultimate tightening up and the nature of the barrel knot, whether of standard variety or of the spliced variety as will presently be apparent. Next, clamps 601 are longitudinally moved toward the adjusted spreader 201 to place its adjacent side in close proximity to the yet free back, or bight, of the spreader, clamping bolts 734 being loosened for the purpose. The spreader on its opposite side 301 is then moved as near to that side of the clamp as is the spreader 301 on the other side.

The clamping bolts 711 of end plate 702 on the left side of the mechanism having been loosened, the end plate of its devices 100, 200 and 400 supported therefrom are longitudinally adjusted to place its clamp 101 in the same positional relation to the mouth of the adjacent spreader 301 as that previously established between the corresponding parts at the right of the machine. The adjusted end plate 702 being then secured in place, the left hand spreader 301 is now adjusted transversely of the machine if necessary to place it in the plane 303 of the associated inserter 401, each spreader thus being aligned with its inserters.

Thereupon a clamp 601 is given its final adjustment, such longitudinal movement as to make sure it is centered midway between the two spreaders 301, and such angular movement to make sure it is about at right angles to a line 380 extending approximately through those points at which the spreaders are nearest to each other and thus diagonally at an acute angle to the planes 303, reaching those planes at points not far from the points where the bights of the U-shaped cross-section are cut by those planes. Bolts 734 are then tightened in place.

The trains of gears for the driving of the rotatable gears and journals 201 and 202 are then chosen in accordance with the direction in which it is desired to make the wraps of the barrel knot. Obviously either one of the wrapping devices 200 may be given either direction of rotation merely by the shifting of idler 230 from the upper to the lower train of gears, or vice-versa. Let us suppose that, as shown in full lines in Figure 3, crank 240 is to be turned counterclockwise as shown by the applied arrow, and that rotating device 200 at the right of the machine is to be given counter-clockwise movement as one faces that end of the machine, while wrapping device 200 at the opposite end of the machine is to be given clockwise movement in order to achieve the wraps at each end of the barrel knot in the direction of the twist, a right hand twist in the twine illustrated as laid in the machine ready to be tied. Gear 230 at the right end of the machine then occupies position in the upper train of gears as shown in full lines, whereas it is omitted from that train at the left hand end and is used as gear 236 in the lower train, as clearly appears in the plan view of Figure 2, the stud 250 provided for it at the left hand end then being without a gear. All gears, of course, are expected to be secured against axial dislodgment from the train by appropriate means for retaining them on their axes, which it has not been deemed necessary to show.

So set up, the machine is ready for the tying of the chosen knot, a standard barrel knot, let us say, of four wraps in opposite directions, yet in the direction of the twist of the twine. The laying of the free end strands 60 to be tied is made by opening the clamp 601, placing one strand 60 in the groove 111 of one clamp 101 by springing it into place between flared ends 112, passing the strand downwardly over the horizontal face 212 of the wrapping device 200 at the opposite end of the machine, threading it through the slots 220, then by way of guiding and retaining channels 501 of the tensioning means, below the base 701 of the machine, and up through the other channel 501 to and through the slots 220 of the wrapping device 200 on the same side of the machine and thence past the already engaged clamp 101 to the opposite clamp 101 and to spring the other free end strand into its retaining groove 111. The extremities 61 of the free end strands 60 are then adjusted to the approximately proper length above the retaining grooves 111, whereupon the parallely extending mid-portions of the strands are placed in the grooves of the tensioning clamp 601 and clamped down in the relative attitude shown in Figures 1 and 2. Next, the tension creating weight 502 is hooked onto the bight 52 of the twine loop 50. Then spreaders 301, if not already in place extending vertically between the mid-portions of the strands 60 at the time they are initially laid and fixed in position by clamp 601, are projected upwardly from rotated positions which they may have occupied to the vertical positions shown in Figures 1 and 2. This movement of the spreaders is controlled by handle 313. Should the grooves of clamping device 600 not have spread the strands apart sufficiently to accommodate the full cross-section of the spreaders, the curvilinearly sharpened and smoothed points of the spreaders will enter between the strands and themselves spread the strands apart and make room for the main bodies as they appear in Figure 2. The handle 240 is then rotated counter-clockwise to rotate wrapping devices 200 the necessary number of revolutions to achieve the desired number of wraps. As illustrated, one complete turn of handle 240 will achieve the desired four wraps, for gear 231 as illustrated is four times the diameter of the journal gear 204. Thus each quarter turn of the handle 240 will afford one revolution. One rotates handle 240 one complete turn then stops, the spring ball aligning device 221 then realigning slots 220 at the close of the fourth revolution. If a one to one gear train were used, four turns of handle 240 would have been necessary.

Figure 4 illustrates diagrammatically the relative position of parts when the first wrap of the four has progressed 90 degrees. Wrapping device 200 turning in opposite directions as viewed from the right hand end of the machine have moved axis shafts 102 with them, thus disengaging clutches 420 whose jaws normally lie in vertical planes, and the inserters 401 and the free end clamps 101 have been moved together from their normal vertical to the horizontal plane. The first wrap continuing, reaches three-quarter turn and the then attitude of the parts is shown in Figure 5. Twine required for the wrap is being drawn progressively through the jaws of the clamps 101 whose yieldable engagement with the twine permits and regulates this. Adjustment of tension of the spring clamps 101 achieved through thumb nuts 121 on jaws 110 of the clamp regulates the drag on the strands required to achieve wraps of the desired degree of tightness. Due to the positioning of the delivering end of grooves 111 vertically intermediate the first and the last of the number of the wraps, the lead of the strand 60 toward the first wrap inclines toward the spreaders 301, toward the second wrap approaches or reaches the vertical (as suggested in Figure 5), while the lead toward the later wraps inclines away from the spreaders as indicated in the diagram of all but completed knot which appears in Figure 6. Thus are the wraps effected side by side and close together.

During knot wrapping operations the general horizontality of the main strands of the loop 50 and the adjoining portions of the free end strand 60 is maintained by three agencies acting jointly, any one of which may be relied upon independently of the others to attain this end. The first such agency is constituted by the axially parallel faces 212 of the segments 210 of the wrapping device 200 which resist the radial thrust of the wraps by providing a rest for the main body strands as free end strands are wrapped about them. This is especially true when the directions of rotation chosen are toward the surfaces 212, the twine being thrust down upon the faces 212 as indicated in Figures 5 and 6. Secondly, the main bodies of spreaders 301 tend to frictionally resist relative movement of the strands which embrace them to any appreciable extent above and below the mid-portions of the spreader. Especially do the supporting rods 310, when engaged upon their upper sides by those mid-strand portions overlying them, prevent downward movement of the strands. At times it is desirable to initially adjust the spreaders to place the tops of rod 210 substantially at the level of clamp 600, or conversely by shims or choice of clamping jaw plate thickness to adjust the clamping level of tension clamp 600 to the level of the tops of rods 310. Thirdly, there is the tension clamp 601 itself which, whenever used (it may be omitted though its use is preferred) definitely fixes the central portions and positively resists radial riding movement during the wrapping operation. When the tension clamp 601 is omitted the tension of clamps 101 is increased to resist against tensioning device 500. So operated, once the first wrap is completed, the wrap itself aids in keeping the main strands in the vicinity of the wrapping axis.

With only one-quarter turn to go to complete the four wraps, the inserter axis shafts 402 are each 90 degrees away from their closing position with the mating jaws of inserter operating clutches 420. As the clutch toothed ends of shafts 402 have completed each preceding revolution they have passed freely through the vertically open mating jaws of the clutches 420. At the close of the fourth revolution, however, they are brought to rest between those mating jaws as clearly appears in Figure 7, and so it will be at the end of any desired number of wraps.

The vertical elevation in Figure 7 depicts diagrammatically the operation of the inserting device 400. Here, by virtue of counter-clockwise shift of operating handle 424 following thumb release of latch 430, the arcuate inserter members 401 have been rotated through 60 degrees or more, first to engage the strand extremities 61 in their grooved ends 441, then to give the strands loop form, and project the loops into the hollow cross-section of the spreaders 301 through and between the spread strands of the mid-portions of the knot being formed. Rotation of the inserters 401 to their extreme positions draws the extremities 61 not only all the way out of the yieldably engaging clamps 101 but pushes them all the way through the spreaders and between the spread strands to the dotted line positions shown in Figure 7. The bight of the inserted loop slides over the smoothed end of the inserters and the drag of it draws tightly on the wraps and finally pulls the terminal ends tightly down between the mid-strands of the knot.

The knot being thus completed, the spreaders 301 and the inserters 401 are both withdrawn using operating handles 424 and 313. First the spreaders 301 are withdrawn (if the attitude and the clearance dimensions of its cross-section with the inserter in position is such as to admit of its first withdrawal) and then the inserters 401; or alternatively, first the inserters 401 and then the spreaders 301. In either case the inserted extremities remain between the central reaches of the strand. While the friction of the extremities strand with strand as they are wedged by the inserted in the angle between the main strand and the first wrap is sufficiently greater than the friction between the extremities and the smooth engaging side of the inserter during the withdrawal of the latter to prevent withdrawal of the inserted free end during the withdrawal of the inserter which precedes withdrawal of the spreader, a first withdrawal of spreader when dimensionally permissible, results in a closing of the angle between the first wrap and the main strand, thus tightening its hold upon the inserted free end.

The inserters and spreaders having been returned to their normal rest positions out of engagement with the strands and the tension of the loop having been relieved by removing plate 502, central clamping device 600 is released and loop 50 and the completed barrel knot removed from the machine. Drawn taut, it takes the appearance shown in Figure 9 and upon application of substantial tension either before or during its tensile test, it takes the tightened form shown in Figure 10. The narrower central clamping device 600 and the closer the inserters 401 can be brought to each other, the shorter will be the mid-portions depicted in Figure 9 and the less will be the slack which needs to be taken up when the knot is tightened as in Figure 10.

The modification diagrammed in plan form in Figure 13 is directed to this end. In it tie clamp 601 is of extremely narrow width, let us say one-eighth of an inch. It is depicted as but a single overlying jaw 603 adapted to be rocked about a pivotal axis 650 on pedestal 703 by an operating handle 611. Spreaders 301 are commonly supported from a single rod 310 which underlies and coacts with the single jaw 603 of clamp 601. The spreaders lie very close to the narrow clamp. Both they and their mating free end clamp devices 100 and inserter devices 400 are arranged in planes 303 parallel to the axis of the knot which is the axis of the wrapping devices 200, and tie clamp 601 is arranged at right angles to that axis. The whole contributes to a foreshortening of the knot as delivered from the machine, with resultant or corresponding lessening of the slip.

Setting up the machine to tie the spliced barrel knot instead of the standard barrel knot requires but the simplest of changes in the setting up operation, merely an angular setting of the tie clamp 601 to shift the clamped strands transversely respectively toward the axis of the knot, sufficiently to bring them respectively substantially centrally over the sharp points 302 of the upwardly projected spreaders 301. The result as shown in Figure 11 is that the spreaders 301 instead of spreading the clamped strands apart, enter and spread apart the fibers of the respective strands to make splicing openings 71 in the bodies of the strands to receive the ends 61 of the knot following the wrapping. All other operations of the mechanism and all other relations of the parts thereof are the same as those obtaining in the making of the standard barrel knot. The completed spliced knot is shown in Figure 12, wherein the knot is illustrated as having been drawn taut and the wraps drawn tightly against the splices which have been made by thrusting the ends 61 through the bodies of the strands. The spliced barrel knot has a number of excellent qualities. But a relatively small degree of slip is required to pull it tight; and it is very strong.

While the manifold variations in the makeup of the standard and spliced barrel knot adapted to be tied by this machine and the adjustments incident to bringing about these variations have required extensive description, it should be noted that the machine is adapted to be operated to produce any chosen knot with great facility and rapidity. Once set up for any given knot (and the setting up requires but very few minutes) ties may be made at the rate of 30 to 50 an hour, depending upon the experience and skill of the operator. For any given set up in trying out a given knot in different kinds of twine, this facility and rapidity of operation is of greatest convenience. At most, as between twines of different material and different diameter, one has but to change the tension of the yieldably engaging free end clamps 101 through tension screws 121. To try out the effect of different numbers of turns one has but to turn the wrapping handle 240 as required. To change the direction of the wraps one has but to inter-change gears 231 and 236.

Obviously the machine of my invention is adapted to the tying of barrel knots for purposes other than laboratory testing, as for example, for the joining of two twines together for any other purpose. A most useful purpose is embodiment in mechanisms for the making of ties about packages such as bales. I have embodied the tying mechanism of this machine in an automatic twine tying mechanism for hay balers upon which patent application is soon to be filed.

Yet other embodiments and yet other modifications of the machine of my invention are within the range of both engineering and creative ability of those who address themselves to the art. Insofar as they partake of the spirit of my invention, and inasmuch as future developments may the more fully reveal its generic spirit, the ambit of the annexed claims should be extended to include them.

I claim:

1. A mechanism for tying together the free ends of a strand loop in a barrel knot, comprising a pair of rotatable members spaced axially longitudinally apart, a strand guiding and holding means mounted centrally between them and adapted to spread apart the main bodies of the free ends, a radially offset wrapping finger carried for rotation by each rotatable member and adapted each to receive and hold a free end on one side of said centrally mounted guiding and holding means, and mechanism adjacent said guiding and holding means adapted to effect the insertion of the free ends between the spread main bodies.

2. A mechanism for tying together the free ends of a strand loop in a barrel knot, comprising a pair of rotatable members spaced axially longitudinally apart, a strand guiding and holding means mounted centrally between them and adapted to spread apart the main bodies of the free ends, a radially offset wrapping finger carried for rotation by each rotatable member and adapted each to receive and hold a free end on one side of said centrally mounted guiding and holding means, and reciprocable inserting means adapted to engage the free ends between the wrapping fingers and the guiding and holding means to insert the free ends between the spread main bodies, and means to reciprocate said inserting means.

3. A mechanism according to claim 1 in which the wrapping fingers are grooved to receive and yieldably hold said free ends and frictionally retard the free ends as they are fed to the wraps.

4. A mechanism according to claim 1 in which means is provided for said rotatable members through which the rotatable members may be adjusted, selectively, toward or away from each other.

5. A mechanism according to claim 2 in which said reciprocable inserting means comprises a pair of inserter members each of which is carried, respectively, on one of said rotatable members and is rotatable therewith.

6. A mechanism for tying together the free ends of a strand loop in a spliced barrel knot, comprising a pair of rotatable members spaced axially longitudinally apart, a strand guiding and holding means mounted centrally between them and adapted to space apart the main bodies of the free ends, spreader means for spreading the fibers of the respective strands, a radially offset wrapping finger carried for rotation by each rotatable member and adapted each to receive and hold a free end on one side of said centrally mounted guiding and holding means, and mechanism adjacent said guiding and holding means adapted to effect the insertion of the free ends between the fibers of the respective strands.

References Cited in the file of this patent

UNITED STATES PATENTS

| | | |
|---|---|---|
| 2,143,748 | Webster et al. | Jan. 10, 1939 |
| 2,402,609 | Brabander | June 25, 1946 |
| 2,518,687 | Harvey | Aug. 15, 1950 |